(12) United States Patent
Vecera et al.

(10) Patent No.: US 8,081,495 B2
(45) Date of Patent: Dec. 20, 2011

(54) OVER POWER COMPENSATION IN SWITCHED MODE POWER SUPPLIES

(75) Inventors: Ivo Vecera, Ostrava (CZ); Petr Kadanka, Valasska Bystrice (CZ); Nicolas Cyr, Phoenix, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 549 days.

(21) Appl. No.: 12/275,011

(22) Filed: Nov. 20, 2008

(65) Prior Publication Data
US 2010/0123447 A1  May 20, 2010

(51) Int. Cl.
*H02M 3/335*  (2006.01)
(52) U.S. Cl. .................. 363/21.12; 363/21.13
(58) Field of Classification Search ..... 363/21.08–21.18
See application file for complete search history.

(56) References Cited

U.S. PATENT DOCUMENTS

| | | | |
|---|---|---|---|
| 6,343,026 B1* | 1/2002 | Perry | 363/65 |
| 6,356,466 B1* | 3/2002 | Smidt et al. | 363/21.17 |
| 7,646,616 B2* | 1/2010 | Wekhande et al. | 363/21.12 |
| 2009/0040796 A1* | 2/2009 | Lalithambika et al. | 363/21.17 |

* cited by examiner

*Primary Examiner* — Adolf Berhane
*Assistant Examiner* — Jue Zhang
(74) *Attorney, Agent, or Firm* — Paul J. Polansky (57) ABSTRACT

An over-power compensation circuit for use in a switched mode power supply having a current sense circuit for sensing a current flowing through a power transistor of the switched mode power supply. The over-power compensation circuit includes a peak detector, a sample-and-hold circuit, a current offset generator, and an offset resistor. The peak detector has an input for receiving an input voltage derived from the input line, and an output. The sample-and-hold circuit has an input connected to the output of the peak detector, and an output. The current offset generator has an input connected to the output of the sample-and-hold circuit, and an output for providing an offset current. The offset resistor has a first terminal connected to the output of the current offset generator, and a second terminal adapted to be connected to a current conducting electrode of the power transistor.

10 Claims, 4 Drawing Sheets

OVER POWER COMPENSATION IN SWITCHED MODE POWER SUPPLIES

FIELD OF THE DISCLOSURE

The present disclosure relates generally to switched mode power supplies, and more particularly relates to over power compensation in switched mode power supplies.

BACKGROUND

Power supplies typically include rectifier circuits and transformers for generating a direct current (DC) output voltage from an alternating current (AC) input voltage. Typically, a first rectifier circuit is connected across a primary winding of the transformer, and a power metal oxide semiconductor (MOS) transistor is connected in series with the primary winding of the transformer for driving a current through the primary winding. The first rectifier circuit receives the AC input voltage and provides a rectified voltage to the primary winding of the transformer. A second rectifier circuit is preferably connected across a secondary winding of the transformer and provides the DC output voltage. The DC output voltage can be used to supply operating power to electronic devices such as computers, televisions, printers, battery chargers, and the like.

Generally, a feedback circuit is coupled to the power supply to regulate the DC output voltage. The feedback circuit includes a power transistor connected to the primary winding and a pulse width modulator for operating the power transistor. The pulse width modulator sends a pulse width modulated (PWM) signal to the gate of the power transistor to turn the power transistor on and off. As the power transistor is turned on and off, the energy stored in the primary winding is modulated to control the DC output voltage. The DC output voltage is used to change the duty cycle of the PWM signal. Thus, the DC output voltage provides feedback to the pulse width modulator for regulating the DC output voltage to a desired DC voltage level.

Additionally, the feedback circuit can operate a current sense circuit to sense the current through the primary winding of the transformer. The current sense circuit operates to prevent saturation of the primary winding of the transformer. If the current sense circuit determines that the sense current is greater than a threshold current level, the current sense circuit changes the duty cycle of the PWM signal to reduce the amount of current through the primary winding of the transformer. However, there are inherent propagation delays inside the current sense circuit and in turning off of the power transistor. Thus, by the time the current actually stops flowing through the power transistor, the current has increased above a desired threshold. In addition, a slope of the current is proportional to the input voltage. Therefore, the overshoot of the current above the desired threshold is higher at a high input voltage than at a low input voltage for the same propagation delay. As a result, the maximum power at the high input voltage is higher than at the low input voltage.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

Figure 1:
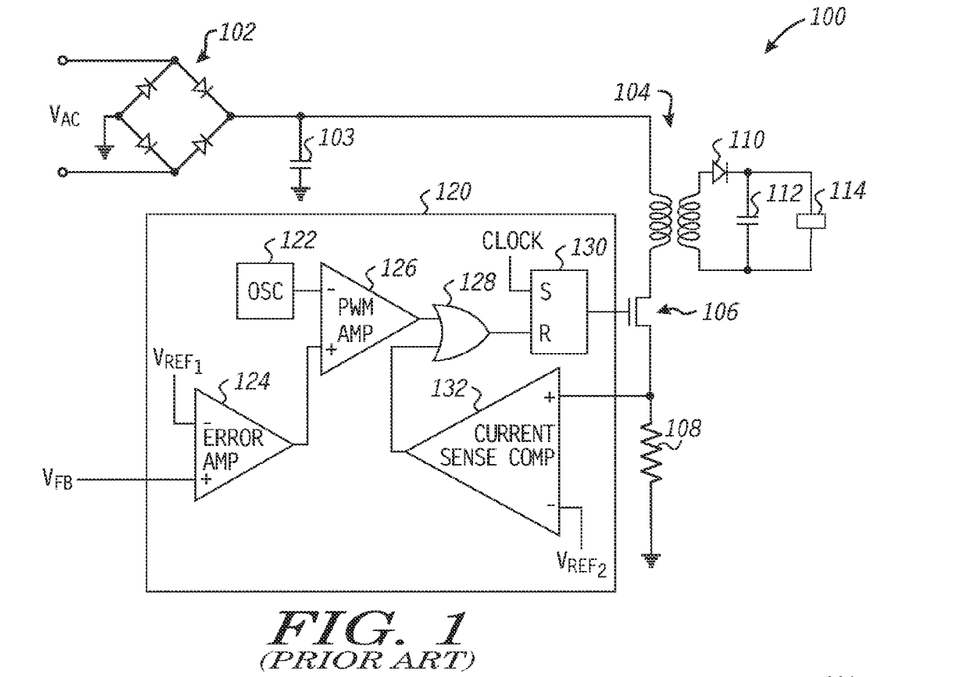
FIG. 1 illustrates in partial block diagram, partial logic diagram, and partial schematic form a switched mode power supply known in the prior art.

FIG. 1 illustrates in partial block diagram, partial logic diagram, and partial schematic form a switched mode power supply 100 known in the prior art. Switched mode power supply 100 includes generally a bridge rectifier 102, a capacitor 103, a transformer 104, a power metal oxide semiconductor (MOS) transistor 106, a sense resistor 108, a diode 110, a capacitor 112, a load 114, and an integrated circuit switched mode power supply controller 120. Bridge rectifier 102 has input terminals for receiving a line voltage labeled "$V_{AC}$", a first output terminal for providing a rectified voltage, and a second output terminal connected to a ground power supply voltage terminal. Capacitor 103 has a first terminal connected to the first output terminal of rectifier 102, and a second terminal connected to ground. Transformer 104 has a primary winding and secondary winding. The primary winding has a first terminal connected to the first output terminal of rectifier 102, and a second terminal. MOS transistor 106 has a drain connected to the second terminal of the primary winding of transformer 104, a gate, and a source. Resistor 108 has a first terminal connected to the source of MOS transistor 106, and a second terminal connected to ground.

The secondary winding of transformer 104 has a first terminal, and a second terminal. Diode 110 has an anode connected to the first terminal of the secondary winding of transformer 104, and a cathode. Capacitor 112 has a first terminal connected to the cathode of diode 110, and a second terminal connected to the second terminal of the secondary winding of transformer 104. Load 114 has a first terminal connected to the second terminal of diode 110, and a second terminal connected to the second terminal of the secondary winding of transformer 104.

Integrated circuit 120 includes an oscillator 122, an error amplifier 124, a pulse width modulator (PWM) comparator 126, an OR gate 128, a flip-flop 130, and a current sense comparator 132. Oscillator 122 has an output terminal for providing a ramp signal. Error amplifier 124 has an inverting input terminal for receiving a reference voltage labeled "$V_{REF1}$", a non-inverting input terminal for receiving a signal labeled "$V_{FB}$", and an output terminal. PWM comparator 126 has an inverting input terminal connected to the output terminal of oscillator 122, a non-inverting input terminal connected to the output terminal of error amplifier 124, and an output terminal. OR gate 128 has a first input terminal connected to the output terminal of PWM comparator 126, a second input terminal, and an output terminal. Flip-flop 130 has a set input terminal for receiving a clock signal labeled "CLK", a reset input terminal connected to the output terminal of OR gate 128, and an output terminal connected to the gate of transistor 106. Current sense comparator 132 has a non-inverting input terminal connected to the first terminal of resistor 108, an inverting input terminal for receiving a reference voltage labeled "$V_{REF2}$", and an output terminal connected to the second input terminal of OR gate 128.

In operation, switched mode power supply 100 takes a rectified line voltage and converts it into a regulated direct current (DC) output voltage provided to load 114. Integrated circuit 120 regulates the duty cycle of the control signal on the gate of transistor 106 to control the current flowing through the primary winding of transformer 104, and thus the voltage provided at the first terminal of the secondary winding of transformer 104. Diode 110 ensures that current always flows from the secondary winding and never into the secondary winding from capacitor 112, which stores charge so as to smooth the output voltage from variations in the load.

Integrated circuit 120 maintains regulation by receiving a feedback voltage $V_{FB}$. $V_{FB}$ is received as a fraction of the output voltage and is generated by using a resistor divider (not shown in FIG. 1). Error amplifier 124 amplifies the difference between $V_{FB}$ and reference voltage $V_{REF1}$ to form an error voltage, and PWM comparator 126 compares this error voltage to the ramp signal provided by oscillator 122. Signal CLK sets flip-flop 130 on a cycle-by-cycle basis, but PWM comparator 126 through OR gate 128 resets flip-flop 130 based on the error voltage. Current sense comparator 132 determines whether the current through the primary winding exceeds a threshold current based on a comparison between a voltage across resistor 108 and a threshold voltage $V_{REF2}$, and if so current sense comparator 132 causes flip-flop 130 to be reset and hence MOS transistor 106 to be rendered nonconductive.

However, current sense comparator 132 uses a fixed reference voltage to measure the current through current sense resistor 108 and hence the current sense shutoff level. In many situations this current sense technique is sufficient to render MOS transistor 106 nonconductive at the proper time to limit the output power and avoid saturating transformer 104. However, if the line voltage $V_{AC}$ increases, the slope of the current through transistor 106 increases proportionally. Thus, by the time the current actually stops flowing through transistor 106, the current has increased above a desired threshold. Therefore, the overshoot of the current above the desired threshold is higher at a high input voltage than at a low input voltage for the same propagation delay in the integrated circuit 120. As a result, the maximum power at the high input voltage is higher than at the low input voltage.

Figure 2:
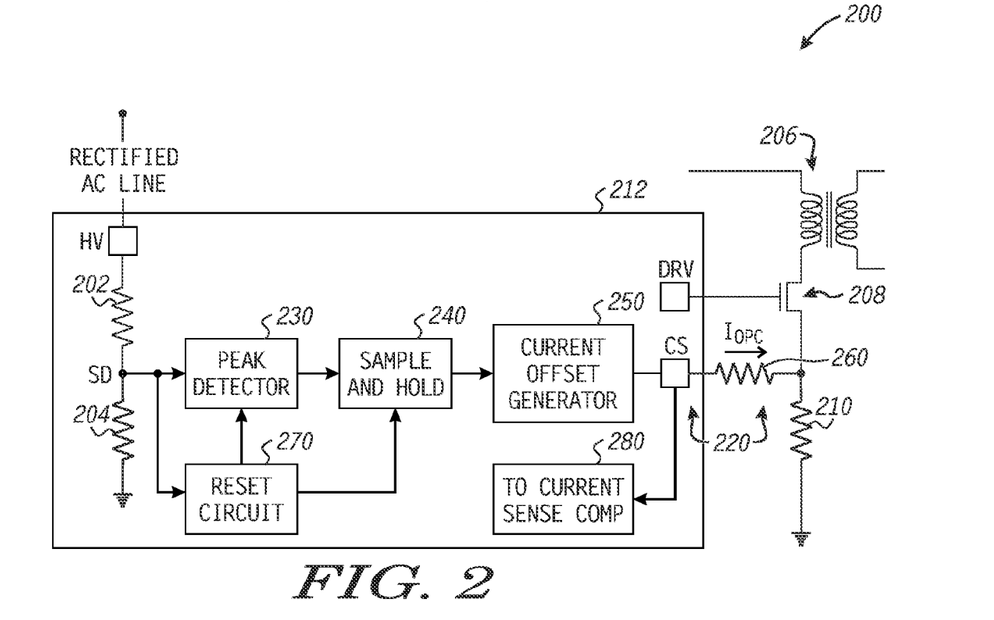
FIG. 2 illustrates in partial block diagram and partial schematic form a switched mode power supply according to the present invention.

FIG. 2 illustrates in partial block diagram and partial schematic form a switched mode power supply 200 according to the present invention. Switched mode power supply 200 includes a transformer 206, a power MOS transistor 208, a sense resistor 210, and an integrated circuit 212. Transformer 206 has a primary winding and a secondary winding. The primary winding has a first terminal connected to the AC line, and a second terminal. The secondary winding has a first terminal and a second terminal. MOS transistor 208 has a drain connected to the second terminal of the primary winding of transformer 206, a gate, and a source. Resistor 210 has a first terminal connected to the source of transistor 208, and a second terminal connected to ground.

Integrated circuit 212 includes resistors 202 and 204, an over power correction circuit 220 having a peak detector 230, a sample-and-hold circuit 240, a current offset generator 250, a reset circuit 270, and a current sense comparator 280. A high-voltage (HV) pin of integrated circuit 212 receives a rectified (full wave rectified or half wave rectified) input voltage, labeled "HV." Resistor 202 has a first terminal connected to HV, and a second terminal connected to a node labeled "SD." Resistor 204 has a first terminal connected to the second terminal of resistor 202, and a second terminal connected to a ground power supply voltage terminal. Peak detector 230 has a first input terminal connected to node SD determined by a voltage divider created between resistors 202 and 204, a second input terminal, and an output terminal. Sample-and-hold circuit 240 has a first input terminal connected to the output terminal of peak detector 230, a second input terminal, and an output terminal. Current offset generator 250 has an input terminal connected to the output terminal of sample-and-hold circuit 240, and an output terminal for providing an offset current. An off-chip offset resistor 260 has a first terminal for receiving the offset current, and a second terminal connected to the first terminal of resistor 210. Reset circuit 270 has an input terminal connected to node SD of the voltage divider created by resistors 202 and 204, a first output terminal connected to the second input terminal of peak detector 230, and a second output terminal connected to the second input terminal of sample-and-hold circuit 240. Current sense comparator 280 has an input terminal for receiving the offset current.

Switched mode power supply 200 also includes other elements, not shown in FIG. 2, corresponding to elements in FIG. 1, including a bridge rectifier on the primary side of transformer 206, and a diode, a capacitor, and a load connected to the secondary winding of transformer 206. Also, integrated circuit 212 includes element corresponding to those of integrated circuit 120 of FIG. 1. Since these elements are conventional and operate as described with respect to FIG. 1, they will not be described further.

In operation, resistor 210 senses the current that flows through transistor 208 by converting the current into a voltage based on the resistance of the resistor 210. A current from the overpower compensation circuit 220 creates a voltage offset in resistors 260 and 210. However, the resistance of resistor 210 is preferably much lower than the resistance of resistor 260, and thus can be neglected. Therefore, current sense comparator receives a combined voltage of the voltage offset in resistor 260 and the voltage that results from the sensed current through resistor 210.

Peak detector 230 identifies and provides a peak value of the voltage at node SD to sample-and-hold circuit 240. Sample-and-hold circuit 240 transfers the peak voltage to current offset generator 250 on a cycle-by-cycle basis of reset circuit 270. Upon every cycle, reset circuit 270 clears the peak voltage in peak detector 230, and causes sample-and-hold circuit 240 to provide the peak voltage to current offset generator 250. Based on the peak voltage from sample-and-hold circuit 240, current offset generator 250 provides the offset current to resistor 260 and thus an offset voltage to current sense amplifier 280. Reset circuit 270 also compares the voltage at node SD to a voltage reference (not shown in FIG. 2). When the voltage at node SD falls below the reference voltage, reset circuit 270 causes sample-and-hold circuit 240 to sample the output of peak detector 230. Then after a delay reset circuit 270 resets peak detector 230, while sample-and-hold circuit 240 continues to hold the previous value from peak detector.

Figure 3:
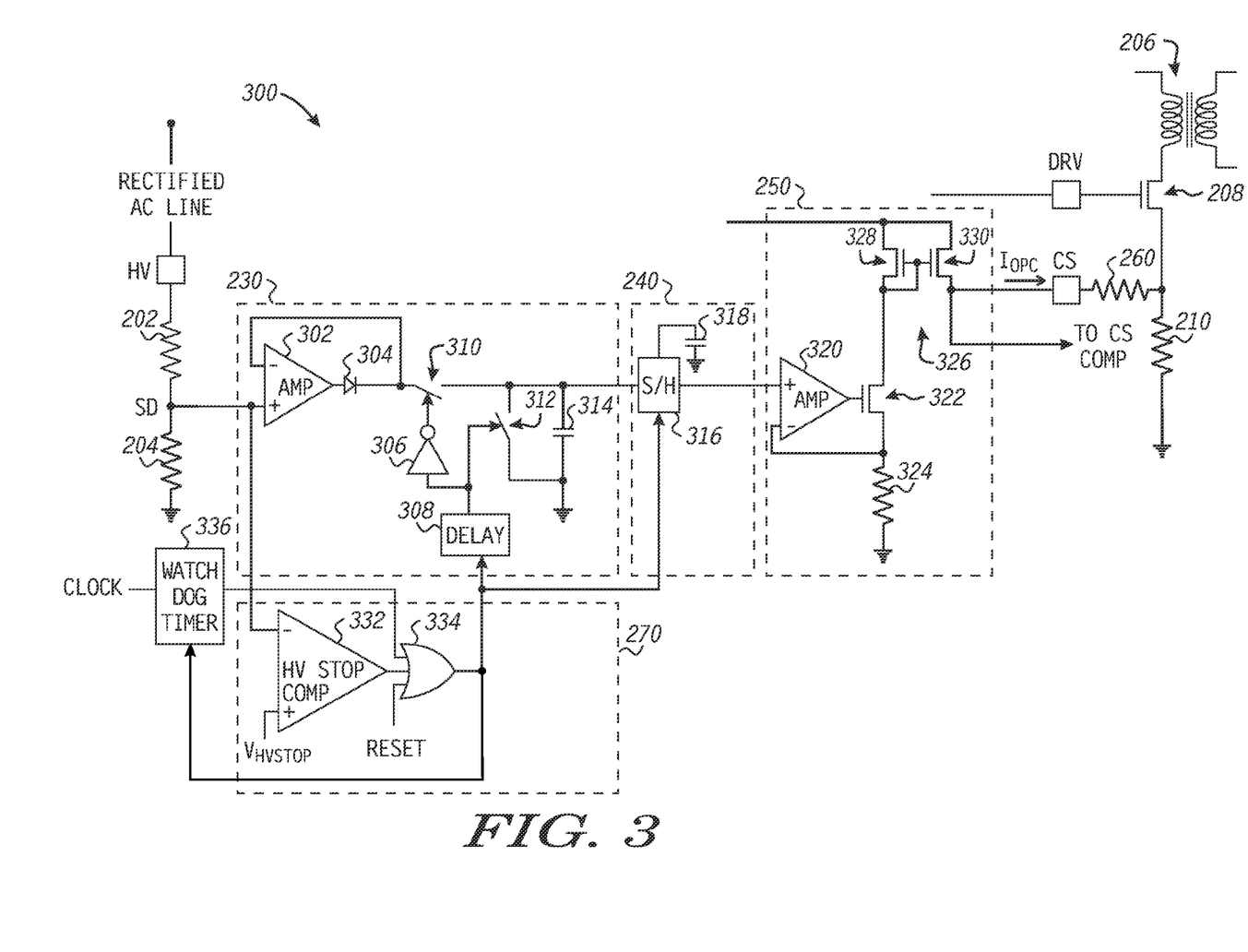
FIG. 3 illustrates in partial block diagram, partial logic diagram, and partial schematic form one embodiment of an over-power compensation circuit for use in the switched mode power supply of FIG. 2.

FIG. 3 illustrates in partial block diagram, partial logic diagram, and partial schematic form one embodiment of over-power compensation circuit 300 for use in the switched mode power supply 200 of FIG. 2. Over-power compensation circuit 300 generally includes resistors 202 and 204, peak detector 230, sample-and-hold circuit 240, current offset generator 250, reset circuit 270, and a watch-dog timer 336. Switched mode power supply also generally includes transformer 206, power MOS transistor 208, and resistors 210 and 260. Transformer 206 has a primary winding and a secondary winding. The primary winding has a first terminal connected to the AC line, and a second terminal. The secondary winding has a first terminal and a second terminal. MOS transistor 208 has a drain connected to the second terminal of the primary winding of transformer 206, a gate, and a source. Resistor 210 has a first terminal connected to the source of transistor 208, and a second terminal connected to ground.

Portions of over-power compensation circuit 300 that correspond to blocks of over-power compensation circuit 220 are shown by dashed boxes having corresponding reference numbers.

A high-voltage (HV) pin of integrated circuit 212 receives a rectified (full wave rectified or half wave rectified) input voltage, labeled "HV." Resistor 202 has a first terminal connected to HV, and a second terminal connected to a node labeled "SD." Resistor 204 has a first terminal connected to the second terminal of resistor 202, and a second terminal connected to a ground power supply voltage terminal. Peak detector 230 generally includes an amplifier 302, a diode 304, an inverter 306, a delay circuit 308, switches 310 and 312, and a capacitor 314. Amplifier 302 has a non-inverting input terminal connected to node SD of the voltage divider created between resistors 202 and 204, an inverting input terminal, and an output terminal. Diode 304 has an anode connected to the output terminal of amplifier 302, and a cathode for providing feedback to the inverting input terminal of amplifier 302. Inverter 306 has an input terminal, and an output terminal. Delay circuit 308 has an input terminal, and an output terminal connected to the input terminal of inverter 306. Switch 310 has a first terminal connected to the cathode of diode 304, a control terminal connected to the output terminal of inverter 306, and a second terminal. Switch 312 has a first terminal connected to the second terminal of switch 310, a control terminal connected to the output terminal of delay circuit 308, and a second terminal connected to ground. Capacitor 314 has a first terminal connected to the first terminal of switch 312, and a second terminal connected to ground.

Sample-and-hold circuit 240 generally includes a sample-hold subcircuit 316, and a capacitor 318. Sample-hold subcircuit 316 has a first terminal connected to the first terminal of capacitor 314, a second terminal connected to the first terminal of delay circuit 308, a third terminal, and an output terminal. Capacitor 318 has a first terminal connected to the third terminal of sample-hold subcircuit 316, and a second terminal connected to ground.

Current offset generator 250 generally includes an amplifier 320, a MOS transistor 322, a resistor 324, and a current mirror 326. Amplifier 320 has a non-inverting input terminal connected to the output terminal of sample-hold subcircuit 316, an inverting input terminal, and an output terminal. MOS transistor 322 has a drain, a gate connected to the output terminal of amplifier 320, and a source connected to the inverting terminal of amplifier 320. Resistor 324 has a first terminal connected to the source of MOS transistor 322, and a second terminal connected to ground. Current mirror 326 includes P-channel MOS transistors 328 and 330. MOS transistor 328 has a source connected to a power supply voltage terminal, a gate, and a drain connected to the gate thereof and to the drain of MOS transistor 322. MOS transistor 330 has a source connected to the power supply voltage terminal, a gate connected to the gate of MOS transistor 328, and a drain for providing an offset current. Offset resistor 260 has a first terminal connected to the drain of MOS transistor 330, and a second terminal connected to the first terminal of resistor 210.

Reset circuit 270 generally includes a comparator 332, and a NOR gate 334. Comparator 332 has a non-inverting input terminal connected to the node SD in the voltage divider created by resistors 202 and 204, an inverting input terminal for receiving a reference voltage labeled "$V_{HVstop}$," and an output terminal. NOR gate 334 has a first input terminal connected to the output terminal of comparator 332, a second input terminal, and a third input terminal for receiving a signal labeled "RESET." Watch-dog timer 336 has a first input terminal connected to the output of NOR gate 334, a second input terminal for receiving signal CLOCK, and an output terminal connected to the second input terminal of NOR gate 334. In another embodiment, over-power compensation circuit 300 may omit watch-dog timer 336, and thus NOR gate 334 need only have first and second input terminals.

In operation, over-power compensation circuit 300 is an analog implementation of over-power compensation circuit 220 of FIG. 2. Resistor 210 senses the current that flows through transistor 208 by converting the current into a voltage based on the resistance of the resistor 210. A current from the overpower compensation circuit 220 creates a voltage offset in resistors 260 and 210. However, the resistance of resistor 210 is preferably much lower than the resistance of resistor 260, and thus can be neglected. Over-power compensation circuit 300 provides the offset voltage to the input terminal of current sense comparator 280 by injecting the offset current through offset resistor 260. The offset voltage is also provided to current sense comparator 280 to compensate for an excess amount of power supplied to switched mode power supply 200 due to the inherent delay in current sense comparator 280 and the inherent delay in turning off the power transistor 208. The offset voltage is also added to a voltage drop across resistor 210. The offset voltage is added to the sensed current to ensure that the current sense comparator 280 turns off at a lower threshold to compensate for the overshoot of the current due to the propagation delay.

$V_{HVSTOP}$ sets the RECTIFIED LINE voltage over which over-power compensation circuit 300 is active. When the voltage at node SD rises above $V_{HVSTOP}$, the output of comparator 332 is high, thus the output of NOR gate 334 is low and switch 310 closes and switch 312 opens. Thus, capacitor 314 begins to charge based on the increase of the voltage at node SD, and the output of amplifier 302. When the voltage at node SD reaches its peak value and starts to decrease, the voltage stored in capacitor 314 corresponds to the peak RECTIFIED LINE voltage over the previous cycle.

When the voltage at node SD falls below $V_{HVSTOP}$, the output of comparator 332 goes low, thus causing the output of NOR gate 334 to go high. The high voltage on the output of NOR gate 334 causes sample-hold subcircuit 316 to transfer the voltage on capacitor 314 to capacitor 318. Upon the delay of delay circuit 308, switch 310 opens and switch 312 closes, thus discharging the voltage from capacitor 314. Switch 310 remains open and switch 312 remains closed until the voltage at node SD again exceeds $V_{HVSTOP}$. Sample-hold subcircuit 316 also transfers the peak voltage stored in capacitor 318 to amplifier 320 of the current offset generator 250.

Thus, on a cycle-by-cycle basis of the output of reset circuit 270 being high, sample-hold subcircuit 316 provides the voltage stored in capacitor 318 to amplifier 320. Transistor 322 is gradually activated by the output voltage of amplifier 320 and the current through transistor produces a voltage across resistor 324. The output voltage of amplifier 320 gradually increases until the current through transistor 322 results in the voltage drop across resistor 324 being substantially equal to the peak voltage stored in capacitor 314 and provided to the non-inverting input terminal of amplifier 320.

Current mirror 326 mirrors the current conducted through resistor 324 into the first terminal of resistor 260. The output current is proportional to the input current based on the relative sizes of transistors 328 and 330.

Watchdog timer 336 re-initializes each time compartor 332 toggles. However, if the voltage at node SD never drops below the $V_{HVSTOP}$, the comparator 332 does not reset over-power compensation circuit 220. Thus, the clock signal, labeled CLOCK, causes watch-dog timer 336 to output the reset signal to NOR gate 334. Therefore, if comparator 332 does not toggle, watchdog timer 336 continues counting and eventually sends the reset signal to NOR gate 334, causing sample-and-hold circuit 240 to sample the peak signal of peak detector 230 and then initialize peak detector for the next cycle. Additionally, a high voltage of RESET signal causes the output of NOR gate 334 to go low, and peak detector 230 to initialize for the next cycle.

Figure 4:
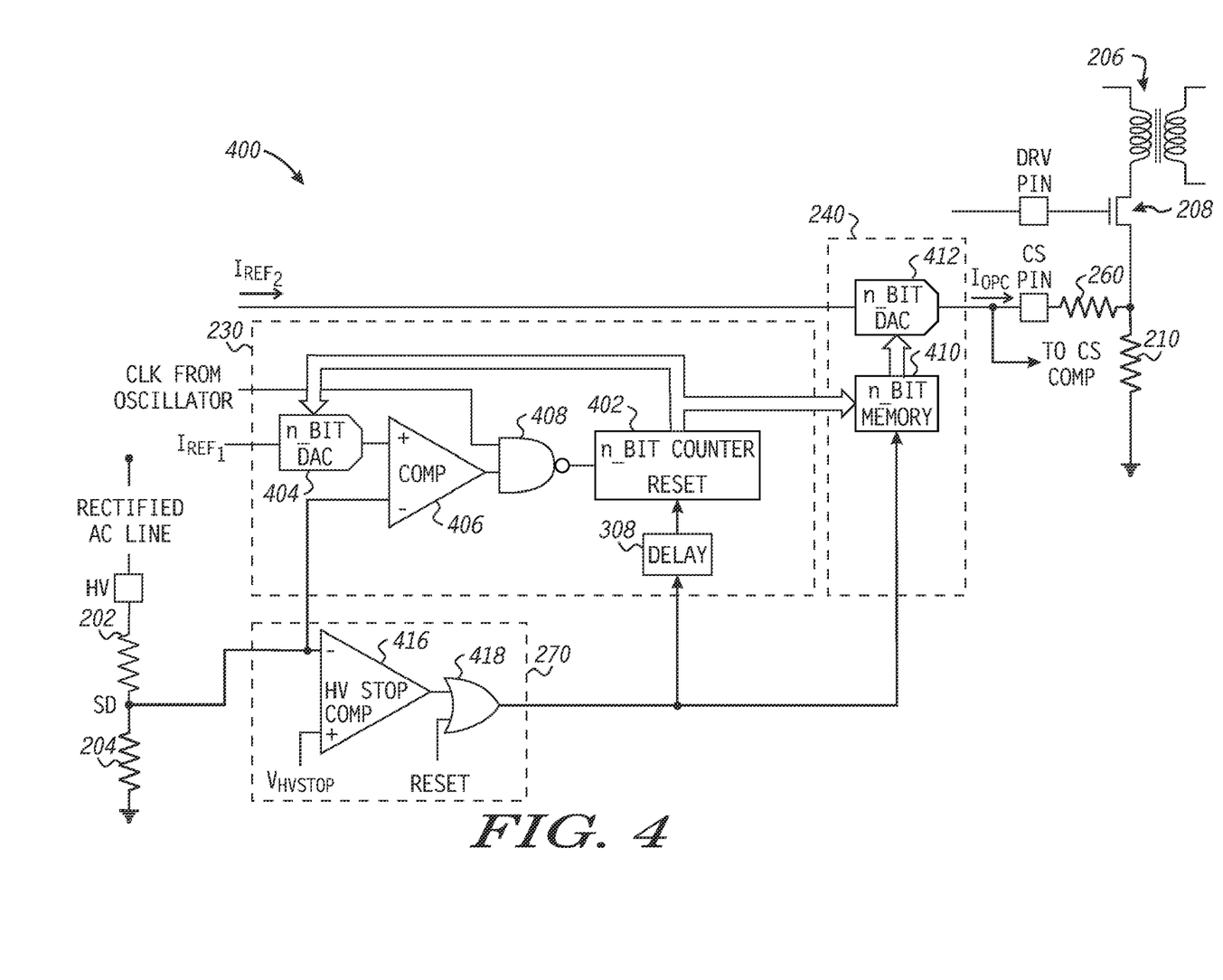
FIG. 4 illustrates in partial block diagram, partial logic diagram, and partial schematic form another embodiment of an over-power compensation circuit for use in the switched mode power supply of FIG. 2.

FIG. 4 illustrates in partial block diagram, partial logic diagram, and partial schematic form another embodiment of an over-power compensation circuit 400 for use in the switched mode power supply 200 of FIG. 2. Over-power compensation circuit 400 generally includes resistors 202 and 204, peak detector 230, store-and-hold circuit 240, offset resistor 260, and reset circuit 270. Switched mode power supply 200 also generally includes transformer 206, power MOS transistor 208, and resistor 210. Resistor 202 has a first terminal for receiving an input voltage from an alternating current (AC) line, and a second terminal. Resistor 204 has a first terminal connected to the second terminal of resistor 202, and a second terminal connected to a ground power supply voltage terminal. Transformer 206 has a primary winding and a secondary winding. The primary winding has a first terminal connected to the AC line, and a second terminal. The secondary winding has a first terminal and a second terminal. MOS transistor 208 has a drain connected to the second terminal of the primary winding of transformer 206, a gate, and a source. Resistor 210 has a first terminal connected to the source of MOS transistor 208, and a second terminal connected to ground.

A high-voltage (HV) pin of integrated circuit 212 receives a rectified (full wave rectified or half wave rectified) input voltage, labeled "HV." Resistor 202 has a first terminal connected to HV, and a second terminal connected to a node labeled "SD." Resistor 204 has a first terminal connected to the second terminal of resistor 202, and a second terminal connected to a ground power supply voltage terminal. Peak detector 230 generally includes delay circuit 308, a counter 402, a digital-to-analog converter (DAC) 404, a comparator 406, and an NAND gate 408. Delay circuit 308 has an input terminal for receiving a reset signal, and an output terminal. Counter 402 has an input terminal, a reset terminal connected to the output terminal of delay circuit 308, and an output terminal. DAC 404 has a first terminal for receiving a current signal labeled "$I_{REF1}$", a second input terminal connected to the output terminal the output of counter 402, and an output terminal. Comparator 406 has a non-inverting input terminal connected to the output terminal of DAC 404, an inverting input terminal connected to the node SD determined by the voltage divider created between resistors 202 and 204, and an output terminal. NAND gate 408 has a first input terminal for receiving the clock signal, CLK, from oscillator 122 of FIG. 1, a second input terminal connected to the output terminal of comparator 406, and an output terminal connected to the input terminal of counter 402.

Sample-and-hold circuit 240 generally includes a memory 410, and a DAC 412. Memory 410 has an input terminal connected to the output terminal of counter 402, a write terminal for receiving the reset signal, and an output terminal. DAC 412 has a first input terminal for receiving a reference current, labeled "$I_{REF2}$," a second input terminal connected to the output terminal of memory 410, and an output terminal for providing an offset current. Reset circuit 270 generally includes comparator 416, and a NOR gate 418. Comparator 416 has a non-inverting input terminal connected to node SD, an inverting input terminal for receiving voltage reference $V_{HVSTOP}$, and an output terminal. NOR gate 418 has a first input terminal connected to the output terminal of comparator 416, a second input terminal for receiving signal RESET, and an output terminal connected to the first terminal of delay circuit 308 and to the write terminal of memory 410. Offset resistor 260 has a first terminal for receiving the offset current from DAC 412, and a second terminal connected to the source of MOS transistor 208.

In operation, over-power compensation circuit 400 is a digital implementation of over-power compensation circuit 220 of FIG. 2. $V_{HVSTOP}$ sets the RECTIFIED LINE voltage over which over-power compensation circuit 400 is active. When the voltage at node SD rises above $V_{HVSTOP}$, the output of comparator 416 is high, causing the output of NOR gate 418 to go low and counter 402 to start counting and to follow the voltage at node SD. When the voltage at node SD reaches its peak value and starts to decrease, counter 402 stops counting and its output corresponds to the peak RECTIFIED LINE voltage over the previous cycle.

When the voltage at node SD falls below $V_{HVSTOP}$, then the output of comparator 416 goes causing the output of NOR gate 418 to go high. The high voltage on the output of NOR gate 418 causes the output of counter 402 to be written into memory 410, and after a delay of delay circuit 308, causes counter 402 to be reset. Counter 402 remains reset until the voltage at node SD again exceeds $V_{HVSTOP}$. Additionally, a high voltage of RESET signal causes the output of NOR gate 418 to go high and reset the counter 402.

Memory 410 provides its output to the input of DAC 412. DAC 412 provides an output current proportional to $I_{REF}$ based on the digital value stored by memory 410.

Now considering FIGS. 3 and 4 together, over-power compensation circuit 300 is relatively complex, requiring three local feedback loops that require frequency compensation. Moreover it also requires two relatively large capacitors 314 and 318. Finally the offset current is determined by the value of resistor 324, which in common integrated circuit manufacturing processes has a large temperature coefficient.

In contrast over-power compensation circuit 400 is very robust against noise. It contains no local feedback loop and no large capacitors. Moreover for a reasonable number of bits, such as four or five, it provides reasonable precision while occupying smaller integrated circuit area than over-power compensation circuit 300. In addition the offset current has a temperature coefficient that only depends on the temperature coefficient of $I_{REF1}$ and $I_{REF2}$.

Figure 5:
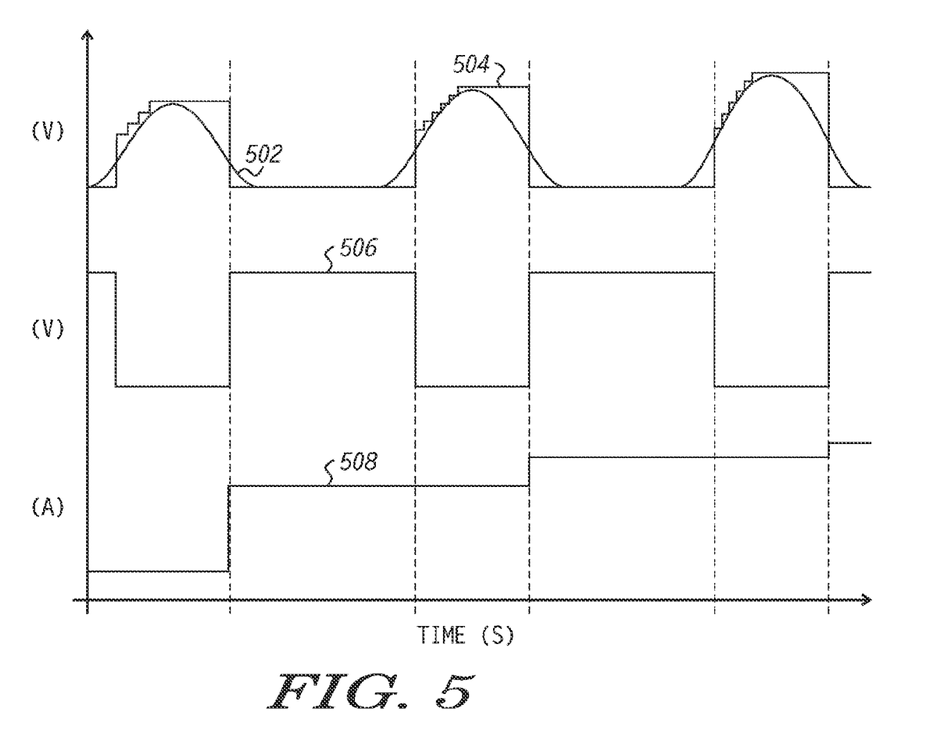
FIG. 5 illustrates a timing diagram of signals relevant to understanding the operation of the over-power compensation circuit of FIG. 4.

FIG. 5 illustrates a timing diagram of signals relevant to understanding the operation of the over-power compensation circuit of FIG. 4. Waveform 502 represents the rectified input voltage provided to integrated circuit 212 (shown in FIG. 2). The rectified AC input voltage can be a half-wave rectified signal, such that only the positive portions of the AC input voltage are provided to over-power compensation circuit 220, as represented in waveform 502. Waveform 504 represents the output of DAC 404 of peak detector 230 (shown in FIG. 4). Waveform 506 represents the output of the HV STOP comparator 332 of the reset circuit 270. Waveform 508 represents the offset current output from DAC 412 in the sample-and-hold circuit 240.

As represented by waveform 504, the output voltage of DAC 404 continues to increase until the peak voltage of the input voltage is determined, and DAC maintains the peak voltage until the counter 402 receives the reset signal, as represented by waveform 506. Memory 410 also receives the reset signal on the write input terminal and transfers the peak voltage to DAC 412. Upon each cycle of the clock signal, RESET, the offset current, as represented by waveform 508, outputted by DAC 412 is set based on the digital code received from memory 410.

The above-disclosed subject matter is to be considered illustrative, and not restrictive, and the appended claims are intended to cover all such modifications, enhancements, and other embodiments that fall within the true scope of the claims. The switched mode power supply can be implemented with various switching techniques, such as pulse width modulation, variable frequency modulation, and the like. Thus, to the maximum extent allowed by law, the scope of the present invention is to be determined by the broadest permissible interpretation of the following claims and their equivalents, and shall not be restricted or limited by the foregoing detailed description.

What is claimed is:

1. An over-power compensation circuit for use in a switched mode power supply for switching a current supplied from an input line through an inductance using a power transistor and having a current sense circuit for sensing a current flowing through the power transistor, comprising:
   a peak detector having an input for receiving an input voltage derived from the input line, and an output, wherein said peak detector comprises:
      a counter having an input, and an output;
      a digital-to-analog converter having a first input, a second input coupled to said output of said counter, and an output;
      a comparator having a first input coupled to said output of said digital-to-analog converter, a second input for receiving said input voltage derived from the input line, and an output;
      a delay circuit having an input, and an output coupled to a reset terminal of said counter; and
      a NAND gate having a first input coupled to an output of an oscillator, a second input coupled to the output of said comparator, and an output coupled to said input of said counter;
   a sample-and-hold circuit having an input coupled to said output of said peak detector, and an output;
   a current offset generator having an input coupled to said output of said sample-and-hold circuit, and an output for providing an offset current; and
   an offset resistor having a first terminal coupled to said output of said current offset generator, and a second terminal adapted to be coupled to a current conducting electrode of the power transistor.

2. An over-power compensation circuit for use in a switched mode power supply for switching a current supplied from an input line through an inductance using a power transistor and having a current sense circuit for sensing a current flowing through the power transistor, comprising:
   a peak detector having an input for receiving an input voltage derived from the input line, and an output;
   a sample-and-hold circuit having an input coupled to said output of said peak detector, and an output;
   a current offset generator having an input coupled to said output of said sample-and-hold circuit, and an output for providing an offset current; and
   an offset resistor having a first terminal coupled to said output of said current offset generator, and a second terminal adapted to be coupled to a current conducting electrode of the power transistor, wherein said sample-and-hold circuit comprises:
      a memory having a input coupled to said output of said peak detector, and a output; and
      a digital-to-analog converter having a first input, a second input coupled to said output of said memory, and an output coupled to said first terminal of said offset resistor.

3. The over-power compensation circuit of claim 1, wherein said offset current is provided on a cycle-by-cycle basis of said input voltage.

4. An over-power compensation circuit for use in a switched mode power supply for switching a current supplied from an input line through an inductance using a power transistor and having a current sense circuit for sensing a current flowing through the power transistor, comprising:
   a peak detector having an input for receiving an input voltage derived from the input line, and an output;
   a sample-and-hold circuit having an input coupled to said output of said peak detector, and an output;
   a current offset generator having an input coupled to said output of said sample-and-hold circuit, and an output for providing an offset current;
   an offset resistor having a first terminal coupled to said output of said current offset generator, and a second terminal adapted to be coupled to a current conducting electrode of the power transistor;
   a reset circuit having a first input for receiving the input voltage, and an output for providing a reset voltage to said peak detector and said sample-and-hold circuit; and
   a watch-dog timer circuit having an input coupled to said output of said reset circuit, and an output coupled to a second input of said reset circuit, said watch-dog timer circuit adapted to reset said peak detector and said sample-and-hold circuit based on said reset voltage being in a single state for a predetermined amount of time.

5. The over-power compensation circuit of claim 4, wherein said reset voltage is in said single state for said predetermined amount of time said input voltage is a direct current voltage greater than a predetermined threshold.

6. An over-power compensation circuit for use in a switched mode power supply for switching a current supplied from an input voltage derived from an input line through an inductance using a power transistor and having a current sense circuit for sensing a current flowing through the power transistor, comprising:
   a high-voltage sensing circuit adapted to detect a high-voltage level of the input voltage during a line cycle of the input voltage;
   a sample-and-hold circuit adapted to store said high-voltage level of the input voltage;
   a current offset generator for providing an offset current responsive to said high-voltage level stored by said sample-and-hold circuit;
   an offset resistor having a first terminal for receiving said offset current, and a second terminal adapted to be coupled to a current conducting electrode of a power transistor, wherein said high-voltage sensing circuit comprises:
      a counter having an input, and an output;
      a digital-to-analog converter having a first input, a second input coupled to said output of said counter, and an output;

a comparator having a first input coupled to said output of said digital-to-analog converter, a second input for receiving said input voltage derived from the input line, and an output;

a delay circuit having an input, and an output coupled to a reset terminal of said counter; and a NAND gate having a first input coupled to an output of an oscillator, a second input coupled to the output of said comparator, and an output coupled to said input of said counter.

7. The over-power compensation circuit of claim 6, wherein said sample-and-hold circuit comprises:

a memory having a input coupled to said output of said high-voltage sensing circuit, and a output; and a digital-to-analog converter having a first input, a second input coupled to said output of said memory, and an output coupled to said first terminal of said offset resistor.

8. The over-power compensation circuit of claim 6, further comprising:

a reset circuit having a first input for receiving the input voltage, and an output for providing a reset voltage to said high-voltage sensing circuit and said sample-and-hold circuit.

9. The over-power compensation circuit of claim 8, further comprising:

a watch-dog timer circuit having an input coupled to said output of said reset circuit, and an output coupled to a second input of said reset circuit, said watch-dog timer circuit adapted to reset said peak detector and said sample-and-hold circuit based on said reset voltage being in a single state for a predetermined amount of time.

10. The over-power compensation circuit of claim 8, wherein said reset voltage is in said single state for said predetermined amount of time said input voltage is a direct current voltage greater than a predetermined threshold.

* * * * *

UNITED STATES PATENT AND TRADEMARK OFFICE
CERTIFICATE OF CORRECTION

PATENT NO. : 8,081,495 B2
APPLICATION NO. : 12/275011
DATED : December 20, 2011
INVENTOR(S) : Ivo Vecera et al.

It is certified that error appears in the above-identified patent and that said Letters Patent is hereby corrected as shown below:

In the Specification

In column 7, line 5, replace "compartor" with "comparator".

In column 8, line 29, insert --low,-- after the word "goes" and before the word "causing".

Signed and Sealed this
Twenty-third Day of July, 2013

Teresa Stanek Rea
*Acting Director of the United States Patent and Trademark Office*